July 4, 1933.    F. H. OWENS    1,916,739
ELECTRODYNAMIC PHOTOGRAPHIC SOUND DEVICE
Filed July 31, 1929
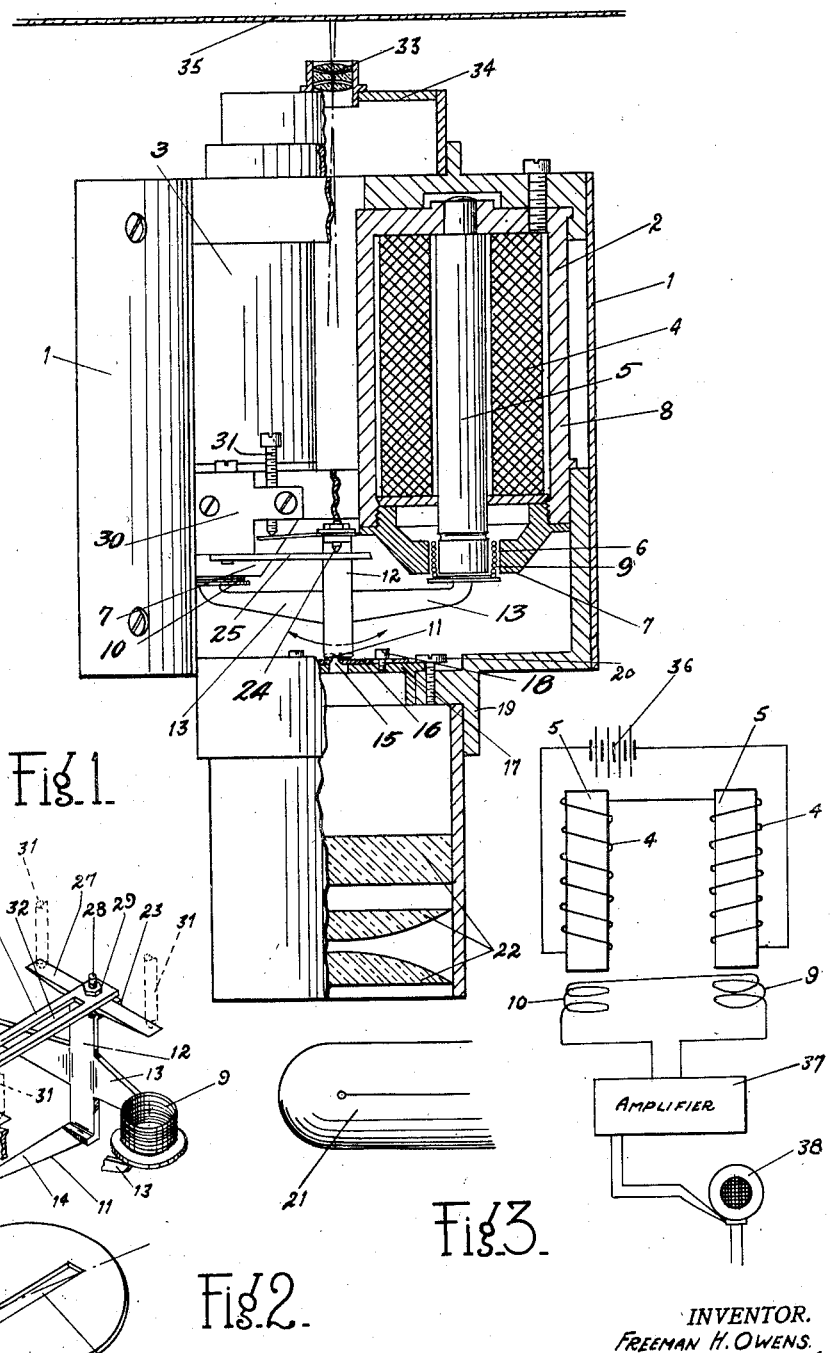
INVENTOR.
FREEMAN H. OWENS.
BY Philip S. Hopkins
ATTORNEY.

Patented July 4, 1933

1,916,739

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

ELECTRODYNAMIC PHOTOGRAPHIC SOUND DEVICE

Application filed July 31, 1929. Serial No. 382,567.

My invention relates to an electrodynamic photographic sound device and has for its principal object the provision of sound actuated electrodynamic means for varying a light beam to be photographed on a strip of film in accordance with the sound to be recorded.

Another object of my invention lies in the provision of a novel shutter or masking device for the slit through which the light passes to the film, said shutter being influenced for oscillation directly by the electrodynamic means.

My invention is adapted to provide a recorded photographic sound record of constant density but of variable width whereby a light source of constant intensity may be employed. It involves the use of a pair of mechanically coupled electromagnets, the voice coils of which operate a shutter adapted to oscillate in exact accordance with the oscillations of the voice coils, such oscillations being produced by acoustically modulated current passing through the voice coils. This shutter oscillates over a slit through which the light rays pass to the film.

Other objects and advantages in details of construction and arrangement of parts will be apparent as the description proceeds, reference now being had to the figures of the accompanying drawing forming a part of this application and wherein like reference numerals indicate like parts.

In the drawing:—

Figure 1 is a side view of my improved apparatus, partly in section for clearness of illustration.

Figure 2 is a detail perspective view of the shutter or masking device used with my invention.

Figure 3 is a detail diagrammatic view illustrating the electrical circuit used with my invention.

The reference numeral 1 refers to a casing which may be of any desired size or shape to enclose a pair of electromagnets 2 and 3 having the usual windings 4 around central cores 5 projecting through air gaps 6 provided by said cores and the removable ends 7 of the outer core 8. It will be understood that both magnets are identical in construction, only one being shown for the purpose of illustration.

A pair of voice coils 9 and 10 respectively surround the ends of the cores 5 within the air gaps 6. Carried by the voice coils 9 and 10 is a shutter member 11, consisting of a U-shaped frame, the legs 12 of which extend upwardly from the shutter portion 11 and are provided with angular arms 13 extending laterally outwardly to the voice coils. The shutter member 11 is, as shown clearly in Figure 2, cut on an angle as at 14 and provided with a knife edge which directly overlies a slit 15 in a plate 16 secured to one side of the housing 1 by means of a flanged holder 17 to which the plate 16 is secured by screws 18. Obviously, if desired, the slit may be cut on an angle and the edge of the shutter formed straight. The holder 17 is suitably secured within an opening on the side of the housing 1 around which extends a flanged portion 19 of the casing. Screws 20 provide suitable securing means for the holder 17. This arrangement provides an effective light lock preventing the passage of light into the housing 1 except through the slit 15. Obviously, oscillations of the shutter member 11 will serve to cover and uncover to a greater or lesser degree the slit 15, thereby permitting the passage of light rays from a light source 21 of constant intensity through condenser lenses 22 and through the slit 15.

The upper ends of the legs 12 of the U shaped shutter member are turned outwardly as at 23 and through these lateral extensions of the legs are positioned downwardly extending pivot points 24 adapted to engage supporting strips 25. These pivot points 24 are in alignment and provide the pintle upon which the shutter is oscillated. If desired, these pivot points may be jewelled for long wearing qualities and must be so constructed and arranged as to provide a pintle which will permit oscillation of the shutter at a very high frequency in order to properly record the acoustically modulated variations in the current passing through the voice coils.

Positioned between the lateral extensions 23 of the legs 12 and the ends of a strip 26 extending across the U shaped shutter frame, are a pair of lateral extending leaf springs 27. The studs 28 of the pivot members 24 are preferably threaded at their upper ends to receive nuts 29 which serve to clamp the strip 26 and the springs 27 to the extensions 23.

Carried by a supporting frame 30 suitably secured to the electromagnets, said frame also serving to carry the supporting bars 25, are adjusting screws 31 the lower ends of which engage the outer ends of the springs 27, whereby the shutter is damped. Proper adjustment of the screws 31 will result in proper damping of the shutter to respond most satisfactorily to the frequencies of the voice coils.

It will be noted that the strip 26 extending between the legs 12 is provided with a slit opening 32 to permit the passage of light therethrough. It will also be observed with reference to Figure 1 that the electromagnet devices are spaced apart sufficiently to permit the passage of the modulated light between them and through the opposite end of the housing 1 from the slit 15 where the light rays are caught by a focusing lens 33 suitably secured in a lens mount 34 attached to the housing 1, and by means of which the modulated light rays are focused upon a photographic film 35 which may be moved past the light by any well known and suitable film moving means.

In Figure 3, is shown the circuit diagram for the device including a battery 36 or other source of electric current supplying the charge of electricity to the windings 4 of the electromagnets. The voice coils 9 and 10 are connected electrically with a suitable amplifier 37 whereby the sound modulated electric impulses arising from the sound source such as a microphone 38 are amplified and transmitted to the voice coils. Obviously, the reaction between the varying flux produced by the voice coil currents and the constant flux of the electromagnets, will cause the voice coils 9 and 10 to move inwardly and outwardly through the air gaps, resulting in oscillating the shutter 11 on its pintles whereby to cover and uncover more or less of the slit 15 and thus vary the width of the light beam photographed upon the film, such variations corresponding to the original sound variations.

Of course, many changes may be made in details of construction and arrangement of parts without departing from the spirit and scope of my invention. I do not limit myself therefore to the exact form herein shown and described other than by the appended claims.

I claim:—

1. A light valve for photographic sound recording comprising a substantially U-shaped member resiliently mounted, and laterally extending arms thereon provided with voice coils responsive to electrically translated sound, said member having a shutter blade thereon.

2. A light valve for photographic sound recording comprising a substantially U-shaped member resiliently mounted and laterally extending arms thereon provided with voice coils responsive to electrically translated sound, the closed side of said U-shaped member comprising a shutter.

3. A light valve for photographic sound recording comprising a substantially U-shaped member resiliently mounted and laterally extending arms thereon provided with voice coils responsive to electrically translated sound, the closed side of said U-shaped member comprising a shutter, and damping means for said member.

In testimony whereof, I affix my signature.

FREEMAN H. OWENS.